Nov. 5, 1968  P. A. HODGE  3,408,706
FASTENER DEVICE
Filed Jan. 19, 1967
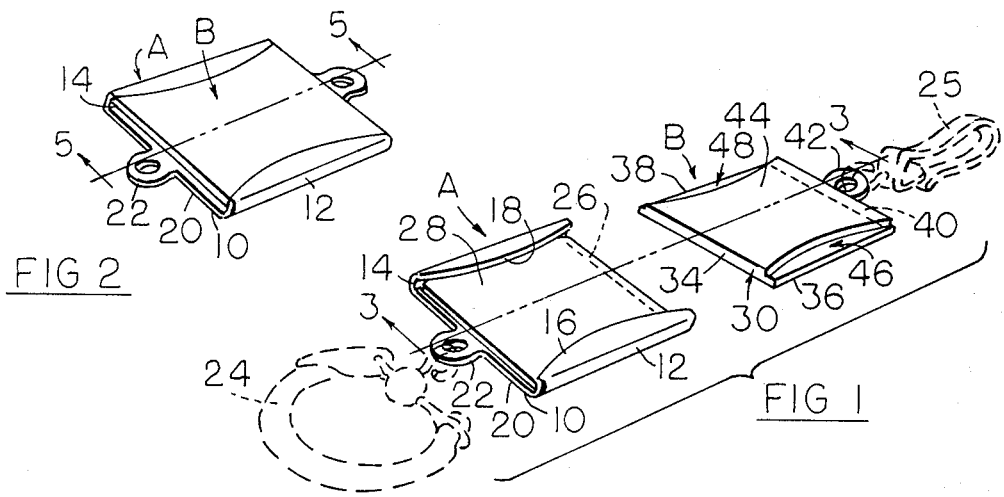
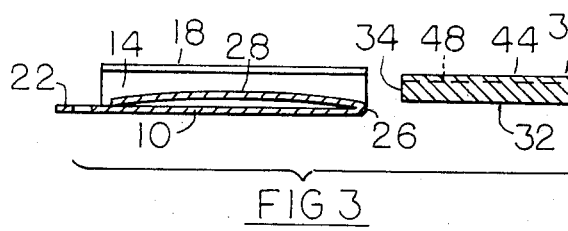
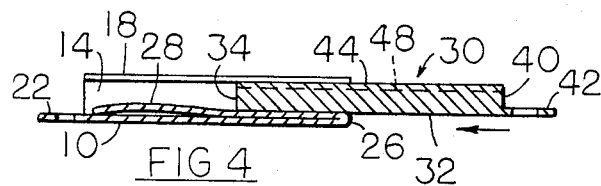
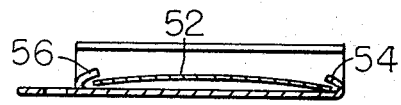
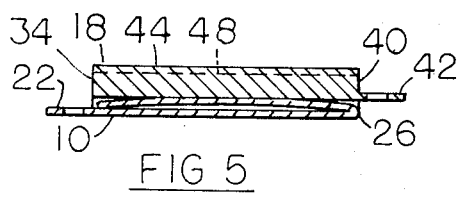
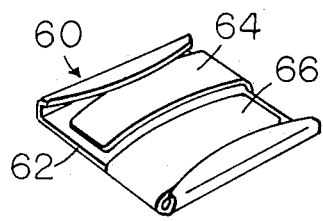
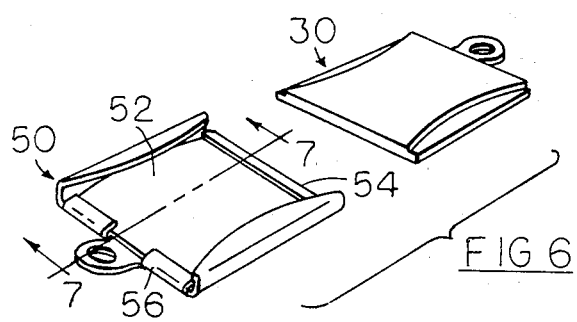
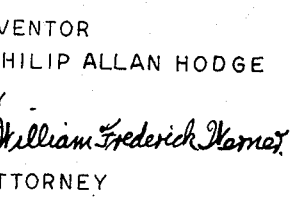
INVENTOR
PHILIP ALLAN HODGE
BY
William Frederick Werner
ATTORNEY

United States Patent Office 3,408,706
Patented Nov. 5, 1968

3,408,706
FASTENER DEVICE
Philip Allan Hodge, Warwick, R.I., assignor to Anson, Incorporated, Providence, R.I., a corporation of Rhode Island
Filed Jan. 19, 1967, Ser. No. 610,322
11 Claims. (Cl. 24—230)

ABSTRACT OF THE DISCLOSURE

This invention relates to clasp type fastener devices and, more particularly, to a two-piece device suitable for detachably connecting in a positive manner two separate members such as jewelry bracelet strap members, separable key chain elements or belt ends. More specifically, this fastener, which is inherently reliable for making frequent disconnections and reconnections, comprises two relatively slidable, resiliently interlockable members having a concealed resilient spring member disposed within the casing of one element and possessing interlocking complementary groove and retaining flange means the respective members.

---

This invention provides in particular a very simple but durable two-piece, slide type fastener which lends itself to relatively inexpensive mass production in which precise tolerances are not critical in the manufacture thereof, and which lends itself to relatively easy separability and rejoinability without the use of both hands. It may be fabricated from any preferably lightweight sheet material including metal and plastics or the like.

In achieving the desired end result of the invention, this fastener utilizes a sleeve-type connector member having a rectangular, flat lower body with upturned sides and inwardly turned top retaining flanges terminating in accurately spaced apart coplanar relation to form a generally open upper face. A resilient leaf-type spring means is unitarily embodied adjacent the inner face of the lower body. The other slide connector member of this two-piece fastener is of generally flat, complementary rectangular form having a thickness for providing a cooperatively slidable fit within the aforementioned sleeve-type connector while substantially fully depressing the resilient spring means carried by the latter: The said slide connector is preferably flat on the lower face which engages the leaf-like spring means, but is shouldered on opposite lateral sides of the upper face in a manner to complementarily receive and interlock with the in-turned flanges of said sleeve-like member responsive to the spring action upon full insertion of the slide member within the sleeve member. Depressing the slide member against the resilient spring means and imparting relative sliding movement of the component members in the opposite direction will effect disengagement of the fastener members. It is understood that one pair of opposed ends of the relatively slidable fastener members are provided with attaching means such as eyelets or the like to facilitate the attachment therewith of the respective ends of the strap or chain-like elements being secured together.

The advantages of my fastener device will become more apparent from the following detailed description directed to construction features and arrangement of components of exemplary forms of my invention as depicted in the following illustrative drawing figures.

FIGURE 1 is a pulled apart perspective view of the two-piece fastener of this invention;

FIGURE 2 is a perspective view of the fastener in assembled condition;

FIGURE 3 is a longitudinal cross-sectional view as taken on line 3—3 of FIGURE 1;

FIGURE 4 is a longitudinal cross-sectional view of the fastener members in partially assembled condition;

FIGURE 5 is a longitudinal cross-sectional view thereof in assmbled condition and as viewed on line 5—5 of FIGURE 2;

FIGURE 6 is a perspective view similar to FIGURE 1 but of an alternate embodiment;

FIGURE 7 is a cross-section view taken on line 7—7 of FIGURE 6; and

FIGURE 8 is a perspective view of still another embodiment of the sleeve-like member.

Referring now to the embodiment depicted in FIGURES 1-5, the two-piece fastener herein comprises a sleeve-like member designated generally as A and a slide member designated generally as B.

The sleeve-like member A may be formed in any suitable manner and includes a generally rectangular flat lower body 10, laterally turned up at one pair of opposite sides to form shallow sides or sidewalls 12 and 14, which are further folded or turned inwardly to form overhanging flanges for retaining the slide member B. The in-turned flanges 16 and 18 terminate in accurately spaced apart coplanar relation as shown. However, it is to be understood that the said flanges 16, 18 may have terminal edges of other than arcuate formation as long as they are of some irregular form to cooperatively seat in complementary formed recessed shoulders of the slide member to be described hereinafter.

One end 20 of member 10 terminates preferably coplanar with the adjacent upturned sidewalls except for a medially disposed, integrally formed eyelet 22 which provides means for uniting an end of a strap or other separable part irrespective of the form thereof. In FIGURE 1 such a part is designated 24 and is depicted in broken lines, being representative of one end of a pull-apart key ring assembly. The lower body 10 is preferably of initially elongated form in the direction of the end opposite eyelet 22 and during fabrication, is folded over upon itself along fold line 26, before the sidewalls and top flanges are completely formed, to provide an integrally formed resilient spring member 28. Spring member 28 may be either straight or arcuate in cross-sectional form, the latter being shown in FIGURE 3. The spring body adjacent the fold line 26 is nearly coplanar with body 10, being folded upon itself, but is resiliently spaced apart from body 10 at its intermediate area. The fold line 26 is disposed preferably in alignment with the other terminal edges of the sidewalls, making for a neat, compact appearance.

The slide connecter member B has a generally flat body 30 of complementary rectangular form, generally coinciding in shape and size with that of sleeve member A. Body 30 preferably has an uninterrupted, smooth lower face 32, a squared, uninterrupted front edge 34, and preferably parallel, opposite lateral edges 36 and 38. Further, it is provided with a squared rearward edge 40 having a medially disposed and preferably integrally formed eyelet 42, similar to 22, or other means to which is united the other end of a strap or other separable part, such as a hook means 25 shown in dotted lines in FIGURE 1 as representative of the other end of the pull-apart key ring assembly aforementioned. Body 30 is further formed with a flat upper surface 44 formed substantially parallel to the lower surface 32; but which upper surface 44 is provided with laterally opposed recessed shoulders 46 and 48. These recessed shoulders 46 and 48 are stamped, machined or otherwise molded in an irregular form which must be generally complementary to the form of the respective in-turned flanges 16 and 18 which interlock therewith. As illustrated, the recesses and flanges are of complementary arcuate configuration in a longitudinal dimension while maintaining generally parallel horizontal surfaces.

It is apparent that the other irregularly shaped complementary formed flange and recess means for effecting the interlock may be provided in the form of saw tooth, rectilineal or sinusoidal configuration.

The operative connecting and disconnecting of this fastener should now be apparent and will be reviewed. To effect interlocking connection, slide member B is placed in alignment with sleeve member B with the leading edge 34 placed upon the spring 28 above the fold line 26 and between and beneath the flanges 16 and 18. Forward movement of the slide B, whose recessed shoulders are face up, depresses the resilient spring 28 as shown in FIGURE 4. The body 30 of slide B is moved forwardly beneath the flanges 16 and 18 until the recessed shoulders 46 and 48 come into longitudinal alignment with and are snapped into interlocking engagement with the in-turned flanges 16 and 18, respectively, responsive to the inherent resilient action of the spring 28 as shown in FIGURES 2 and 5. Accordingly, a very positive interlock is effected which is capable of repeated connection and disconnection, even with one hand. In order to effect disconnection thereof, slight downward pressure is merely applied, as with the thumb, to the general medial area of the slide's upper surface 44, depressing the same against the leaf-like spring member 28 until the recessed shoulders 46 and 48 are clear of the interlocking action of the flanges 16 and 18, respectively. Then slight relative motion is imparted to withdraw the slide member B from the sleeve member A.

Referring to FIGURES 6 and 7, which are illustrative of an alternate form of the sleeve and spring sub-assembly, it is apparent that the sleeve member 50 is of the same general configuration as that of sleeve A above, but is provided with a separate bow spring member 52, rather than the integrally formed spring 28 of sleeve A. Bow spring 52 is retained within the slide by in-turned front and rear flange means 54 and 56 respectively, formed with the sleeve body as clearly shown. The rearward flange 56 may be medially separated to provide for an integrally formed eyelet (not shown), corresponding to the eyelet 22 above, with the sleeve 50. The slide member adapted to cooperate therewith remains identical to and is also designated 30.

Referring next to FIGURE 8 there is depicted a further integrally formed sleeve and split spring member designated 60. Sleeve 60, like the others, is the same in general shape and flange configuration, differing only in the specific spring formation. It is evident that the sleeve body 62 preferably is integrally formed with oppositely extended and laterally offset arm members 64 and 66, which are reversely and oppositely folded back in the form of separate bow springs upon the sleeve body 62, in the same general manner as is spring member 28 described hereinabove. The bow springs 64 and 66 may be longitudinally spaced sufficiently to provide room for forming an integrally formed eyelet (not shown) therewith, corresponding also to that of eyelet 22 described above.

It is to be understood that it is within the contemplation of this invention that a two piece separable fastener, as described hereinabove, may also be fabricated with only one flange and one recessed shoulder therein. The sleeve structure thereof would be much the same as described in the foregoing with the only difference that the side not having the cooperative interlocking flange and recess would merely have a slight retaining flange, preferably of straight longitudinal form to guide and retain the corresponding unrecessed shoulder of the slide member. Otherwise the construction and operation would remain substantially the same.

While specific embodiments of my invention have been illustrated and/or described in detail, it is to be understood that other changes and alterations may be made, formulating additional embodiments, without departing from the inventive spirit and scope thereof as defined in the appended claims.

I claim:
1. A two piece detachable clasp type fastener comprising:
   (a) complementally formed interlocking sleeve and side plate members with adjacently disposed lower and upper face portions and laterally spaced, longitudinally directed sides thereof;
   (b) complemental interengaging locking means formed along at least one of said sides on the respective upper face portions; including at least one slide guiding and retaining flange on the sleeve member parallel to and spaced above the lower face thereof, and inwardly turned to overlay a portion of the upper face of said slide member;
   (c) said flange terminating in an irregular formed edge portion throughout its longitudinal direction;
   (d) a corresponding shaped recess provided in the corresponding adjacent upper face of the slide member to receive the irregular shaped flange; and
   (e) yieldable means carried by the sleeve and interposed between said sleeve and slide members when in assembled condition to yieldably retain said members in interlocking engagement.

2. The fastener as defined in claim 1 wherein the yieldable means is in the form of a resilient spring member formed integrally with the lower face of the sleeve member.

3. The fastener as defined in claim 1 wherein the yieldable means is in the form of a resilient spring member having at least one end secured to the lower inner face of the sleeve member.

4. The fastener as defined in claim 1 wherein the yieldable means is in the form of a bow spring having opposite ends secured to the lower face of the sleeve member.

5. The fastener as defined in claim 1 wherein the yieldable means is in the form of a pair of longitudinally directed spring members integrally formed with and each respectively attached at one end to the lower face of the sleeve member.

6. The fastener as defined in claim 1 wherein the sleeve and slide members are respectively provided with means for uniting other components therewith which are to be detachably interconnected.

7. The fastener as defined in claim 6 wherein the means for uniting include an eyelet attached to each member in opposed relation.

8. A relatively slidable, detachable two piece clasp type fastener comprising:
   (a) an open end sleeve member having closed longitudinally directed side walls, a closed broader lower face and a substantially open upper face;
   (b) locking flange means carried by the upper face adjacent at least one of the longitudinally directed walls;
   (c) resilient means carried within said sleeve member adjacent the lower face;
   (d) a complementally formed slide member adapted to fit within the sleeve member and having a forward edge, a rearward edge, and laterally opposed side edges, and an upper face for disposition adjacent the upper face of the sleeve member when in assembled condition;
   (e) said slide member including an irregularly shaped portion carried in the upper face thereof adjacent at least one of the side edges for complemental interlocking engagement with a similar irregularly shaped portion along the edge of the locking flange means of the sleeve member.

9. The fastener as defined in claim 8 wherein the substantially open upper face is defined by extensions of the side walls, said extensions being inwardly turned from the side walls, terminating in opposed coplaner relation having an irregular marginal configuration, with at least one of the said extensions constituting locking flange means.

10. The fastener as defined in claim 9 wherein the resilient means carried by the sleeve means is a bow spring attached at least at one end to the lower face thereof.

11. The fastener as defined in claim 9 including means carried by the respective sleeve and slide members for uniting other components therewith which are to be detachably interconnected.

References Cited

UNITED STATES PATENTS

| | | |
|---|---|---|
| 462,914 | 11/1891 | Pilkington. |
| 760,311 | 5/1904 | Cleary. |
| 986,060 | 3/1911 | Humphrey. |
| 1,044,024 | 11/1912 | Colby. |
| 2,688,504 | 9/1954 | Parker. |
| 3,200,461 | 8/1965 | Miller. |

FOREIGN PATENTS

| | | |
|---|---|---|
| 13,880 | 9/1890 | Great Britain. |
| 567,220 | 10/1957 | Italy. |

BERNARD A. GELAK, *Primary Examiner.*